United States Patent [19]

Skarbo

[11] 3,853,725

[45] Dec. 10, 1974

[54] SELECTIVE STRIPPING PROCESS

[75] Inventor: Roald R. Skarbo, Lexington, Mass.

[73] Assignee: Kennecott Copper Corporation, New York, N.Y.

[22] Filed: June 28, 1972

[21] Appl. No.: 266,985

[52] U.S. Cl................ 204/112, 75/101 BE, 75/117, 75/119, 423/24, 423/139
[51] Int. Cl........ C22d 1/14, B01d 11/00, B01j 1/04
[58] Field of Search................ 75/101 BE, 117, 119; 423/139, 150, 24; 204/106, 112

[56] References Cited
UNITED STATES PATENTS

| | | | |
|---|---|---|---|
| 3,224,873 | 12/1965 | Swanson | 75/101 BE |
| 3,428,449 | 2/1969 | Swanson | 75/117 |
| 3,440,036 | 4/1969 | Spinney | 75/117 |
| 3,455,680 | 7/1969 | Ashbrook et al. | 423/42 X |
| 3,479,378 | 11/1969 | Orlandini | 75/119 |
| 3,697,400 | 10/1972 | Pang | 75/101 BE X |
| 3,743,585 | 7/1973 | Lowenhaupt et al. | 204/112 |
| 3,761,249 | 9/1973 | Ritcey et al. | 75/119 |

Primary Examiner—Oscar R. Vertiz
Assistant Examiner—Brian E. Hearn
Attorney, Agent, or Firm—Kenway & Jenney

[57] ABSTRACT

The present invention relates to an acid stripping process for recovering nickel selectively from an organic oxime containing copper and nickel. By employing only limited amounts of acid, sufficient to provide about equivalent latent hydrogen ion therein to latent nickel ion of the oxime stream, nickel can be stripped in a multistage countercurrent process preferentially to copper. Hydrogen ion of the acid exchanges with nickel ion of the oxime molecule in accordance with the equation:

$$(R_2°Ni)_{org.} + 2(H^+)_{aqu.} \quad (2R°H)_{org.} + (Ni^{++})_{aqu.}$$

wherein R is the oxime organic moiety and $R_2Ni$ is a chelate of nickel and the oxime. The acid selectively strips nickel when the mole ratio of exchangeable hydrogen ion of the incoming fresh acid to nickel ion of the incoming fresh oxime is maintained between about 1.8 and 2.2.

15 Claims, 1 Drawing Figure

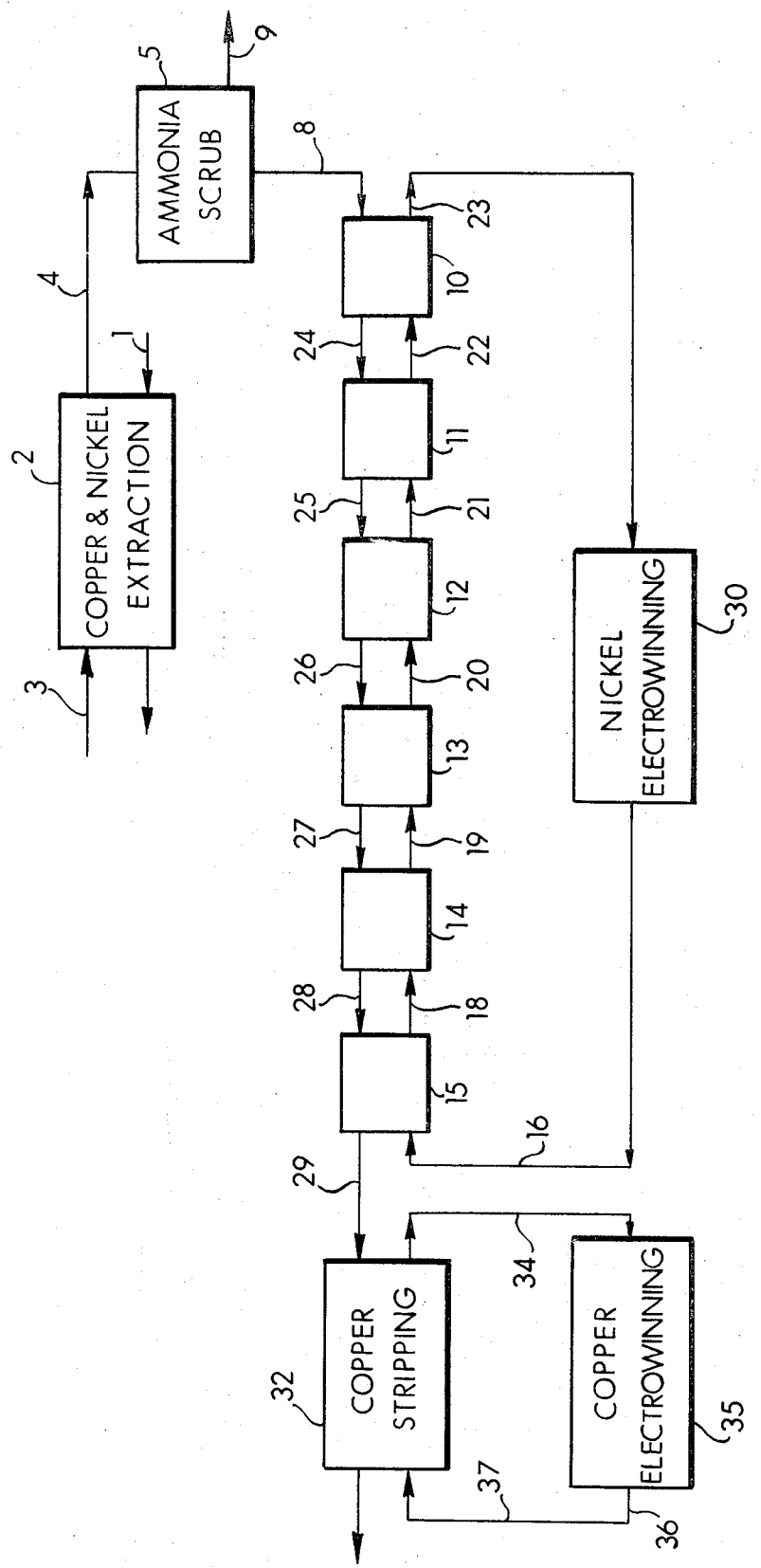

SELECTIVE STRIPPING PROCESS

This invention relates to a method for selectively stripping nickel from an organic oxime solution containing nickel and copper.

Oximes are employed to extract metals, including copper or nickel, selectively from leach solutions containing a plurality of metals by ion exchange wherein exchangeable hydrogen ion of the oxime molecule is exchanged for the metal ion in the leach solution. The prior art has deemed it necessary to conduct extraction in a selective manner so that the pure metal can be recovered easily by subsequent processing such as acid stripping followed by electrowinning. Since most of the commonly employed oximes are capable of extracting a plurality of metals such as copper or nickel, these extraction processes have been conducted under carefully regulated conditions, most usually by controlling the pH and chemical composition of the leach solution. By operating in this manner, separate extraction processes are required to recover selectively each metal from the leach solution. Separate additional steps such as acid stripping and electrowinning for recovering each metal in a relatively pure state are required for each extraction process.

It is known that nickel is stripped more readily than copper from oxime reagents when employing a dilute acid maintained at a pH of about 2 thereby attaining some separation of nickel from copper. However, this process has disadvantages resulting primarily from the process requirement of very high aqueous to organic volume ratios which has rendered it undesirable from a commercial standpoint. Such a process would effect very little nickel deposition in the electrowinning cell per unit volume of acid being cycled. Furthermore, nickel stripping would be incomplete resulting in nickel losses and an undesirably low copper-to-nickel ratio in the organic stream directed from the nickel stripping step to a copper stripping step which would cause an undesirably high build-up of nickel in the copper stripping-copper electrowinning circuit.

If the processing steps employed after the extraction step could be regulated to separate selectively substantially all the copper and nickel, only one extraction would be required to recover substantially all the copper and nickel from the leach solution, thereby resulting in substantial economic advantages. In addition, a wide variety of oximes having good extraction efficiency for nickel and copper but not useful in present processes because of poor selectivity for either copper or nickel could be employed in a process having only one extraction step.

As used herein, the terms "first stripping stage" or "first stage" mean the stage in a multi-stage stripping process wherein metal-loaded ozime solution first is contacted with an aqueous acid solution. The terms "last stripping stage" or "last stage" mean the stage in a multi-stage stripping process wherein fresh aqueous acid stripping solution is contacted first with a metal-containing organic oxime solution and wherein a nickel-depleted oxime solution is removed. The remaining stages in the multi-stage stripping process are referred to herein as the intermediate stages.

The present invention is based upon the discovery that when an organic oxime stream containing copper and nickel is contacted in a multi-stage circuit with controlled amounts of a low pH aqueous acid stream, copper concentration in the aqueous stream reaches a maximum and then is reduced to about zero. Furthermore, in the same system, the concentration of nickel in the aqueous stream in equilibrium with nickel in the organic stream does not pass through a maximum and then decrease but continues to increase until essentially all of the latent hydrogen in the aqueous stream has been exchanged for nickel contained in the organic stream. Thus, by controlling the feed rate of nickel in the organic stream and the feed rate of hydrogen ion in the aqueous stream, copper can be excluded from the aqueous stream and nickel can be excluded from the organic stream.

Based upon this discovery, the metal-loaded oxime stream is contacted countercurrently with an aqueous acid stream at a volumetric ratio of aqueous stream to oxime stream so that a mole ratio of exchangeable hydrogen ion in the fresh aqueous stream to the last stage to nickel ion in the fresh oxime stream to the first stage is maintained between about 1.8 and 2.2, as defined by Equation I below. At these mole ratios, for a given nickel concentration in the oxime stream, substantially all the hydrogen ion of the aqueous stream is exchanged by nickel to the exclusion of copper. During contact of the aqueous stream and the oxime, nickel ion in the oxime stream is exchanged for hydrogen ion in the aqueous stream in accordance with Equation I:

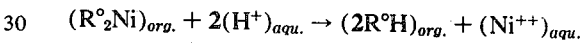

wherein R is the oxime organic moiety and $R_2Ni$ is a chelate of nickel and the oxime. Operating at these mole ratios, permits the use of a low pH acid stripping stream thereby substantially reducing the liquid volumes needed to complete nickel stripping.

During the stripping step, the pH of the acid stream is increased by virtue of hydrogen ion exchange from the acid to the oxime and metal ion exchange from the oxime to the acid. When operating under the conditions set forth above, nickel is stripped preferentially along with some of the copper in the last and some of the intermediate stripping stages. However, due to the higher pH conditions in the first stripping stage than in the last stage and intermediate stages adjacent the last stage, copper is re-extracted selectively into the organic stream is the first and adjacent intermediate stripping stage, so that substantially all of the metal in the acid stream removed from the first stripping stage comprises nickel.

In each stripping stage, copper and nickel in the oxime stream are in equilibrium with copper and nickel in the aqueous stream in accordance with Equation II.

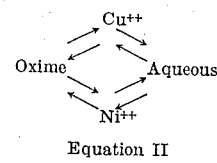

Equation II

The copper and nickel concentration in the aqueous stream depends upon the equivalents of exchangeable hydrogen ion available therein and the equivalents of exchangeable nickel in the oxime stream. When the equivalents of hydrogen ion available in the aqueous stream exceeds the equivalents of nickel ion in the oxime stream, a portion of the excess hydrogen ion will exchange with available copper ion in the oxime stream. Thus, copper ion transfer occurs in the last stage and usually the intermediate stage immediately adjacent the last stage since substantially all the nickel ion in the oxime stream in the first stage and any other intermediate stages has already been exchanged with the available hydrogen ions. Thus, the aqueous in the last stage has the capacity to exchange with substantially all of the nickel ion in the oxime stream as well as some of the copper therein. However, the equilibrium of Equation II is shifted as the aqueous stream containing copper and nickel is contacted with the oxime stream in the first stage and intermediate stages adjacent the first stage since the oxime stream in these stages contains more equivalents of nickel ion. By virtue of the aqueous stream's ability to strip nickel under substantially neutral conditions, nickel in the oxime stream in the first stage and intermediate stages adjacent thereto will be transferred to the aqueous stream and copper will be re-extracted into the oxime stream. In the stripping process, the mole ratio of exchangeable hydrogen ion in the fresh aqueous stream to exchangeable nickel ion in the fresh oxime stream is regulated so that the exchange capacity of the aqueous for nickel does not significantly exceed the equivalents of nickel ion available in the oxime stream. Thus in the first stage, i.e., the final stage where the aqueous stream is contacted with the oxime stream, substantially all of the nickel has been exchanged into the aqueous stream in preference to copper and the aqueous stream does not have additional exchange capacity for copper.

The mole ratio of hydrogen ion in the aqueous stream to nickel ion in the oxime stream is maintained by controlling the concentration of exchangeable hydrogen ion in the aqueous stream and concentration of nickel in the oxime stream and then controlling the flow rates of the fresh organic and aqueous streams to the stripping step. With a greater number of stripping stages, more complete nickel transfer to the aqueous stream is effected with a corresponding amount of hydrogen transfer to the oxime thereby increasing the pH in the aqueous stream recovered from the first stage. While an aqueous stream removed from the first stage having a pH of about 1.0 indicates transfer of essentially all the nickel to the aqueous phase, it is preferred that the pH be maintained between about 2.5 and 4 since a nickel recovery greater than about 99% is obtained thereby with the exclusion of copper. Furthermore these aqueous solutions can be treated easily to recover pure nickel such as by electrowinning. Between 3 and 6 stripping stages have been found to be satisfactory for recovering substantially all of the nickel selectively.

This invention will be more fully described with reference to the results obtained in Example I and the accompanying FIGURE which is a process schematic diagram of this invention. An aqueous leach solution containing copper and nickel 1 is directed to a nickel-copper extraction step 2 wherein it is contacted with an organic oxime stream 3 in multistage countercurrent flow with sufficient oxime so that both the nickel and the copper are transferred from the aqueous stream to the organic stream. The metal-rich organic stream 4 is removed from the extraction step 2 and directed to an ammonia scrub step 5 wherein it is treated as for example by contact with ammonium bicarbonate to remove excess ammonia from the organix stream 4. The scrubbed organic stream 8 and an ammonia-rich aqueous stream 9 are removed from the ammonia scrub step 5. The ammonia is removed in scrub stage 5 to prevent precipitation of nickel ammonium sulfate in the stripping stages. When the oxime contains no ammonia such as when a leach solution other than ammoniacal solution is employed in the extraction step 2, the scrub step 5 need not be employed. The stream 8 is directed to a nickel stripping step where it is contacted in a plurality of stripping stages 10, 11, 12, 13, 14 and 15 in the countercurrent flow with a metal-barren acid stream 16. The mole ratio of exchangeable hydrogen ion in the stream 16 to exchangeable nickel ion in the organic stream 8 is maintained between about 1.8 and 2.2 such that the pH of the acid stream 23 is maintained between about 1.0 and 4.0.

The copper and nickel concentrations in the acid stream are increased in the last stage 15 and the intermediate stages 14 and 13 but in the first stage 10 and intermediate stages 11 and 12 copper concentration in the aqueous stream is reduced while nickel concentration in the aqueous stream is increased further. Thus, stream 18 contains 5.61 g/l copper and 54.9 g/l nickel; stream 19 55.3 g/l nickel and 6.40 g/l copper; stream 20 58.0 g/l nickel and 6.34 g/l copper; stream 21 59.9 g/l nickel and 4.55 g/l copper; stream 22 72.1 g/l nickel and 0.807 g/l copper and stream 23 78.2 g/l nickel and 0.022 g/l copper.

The copper concentration in the organic stream increases in the last stage 15 and intermediate stage 14 while the nickel concentration in the organic stream is reduced as it is passed from the first stage 10 to the last stage 15. Thus, stream 24 contains 2.85 g/l copper and 1.26 g/l nickel; stream 25 3.07 g/l copper and 0.41 g/l nickel; stream 26 3.22 g/l copper and 0.23 g/l nickel; stream 27 3.33 g/l copper and 0.036 g/l nickel; stream 28 3.28 g/l copper and 0.009 g/l nickel and stream 29 2.93 g/l copper and 0.006 g/l nickel. More nickel stripping stages could be employed to strip more nickel from this organic stream but the cost of extra stages may not be justified in view of the small amount of nickel remaining in the oxime stream.

The nickel-rich aqueous stream 23 is treated further to recover pure nickel therefrom such as an electrowinning step 30 from which the nickel-barren aqueous stream 16 can be recycled to the stripping stage 15. The electrowinning step usually is conducted in the presence of a buffer such as boric acid to maintain pH condition in the electrowinning step to assure formation of nickel cathodes with little or no precipitation of nickel compounds. The boric acid in the aqueous stream takes substantially no part in removing nickel from the organic stream in the stripping.

The copper-rich organic stream 29 is directed to a copper-stripping step 32 wherein it is countercurrently contacted in a plurality of stages with an aqueous acid solution such as sulfuric acid under conditions of pH and volumetric ratio of organic stream to aqueous stream to exchange hydrogen ion of the acid with copper ion bound by the oxime molecule and which forms a chelate therewith. The copper-loaded acid stream 34 then is directed to a copper recovery step 35, such as an electrowinning step to recover pure copper therefrom. The copper depleted acid stream 36 can be recycled to the copper-stripping step 32.

Acids which can be employed herein are those when reacted with nickel form a water-soluble nickel salt. Representative suitable acids include sulfuric acid, hydrochloric acid, nitric acid or mixtures thereof. If desired, additional components may be added to the strip solution. Thus, when electrowinning is employed to recover pure metallic nickel, boric acid and a salt such as sodium sulfate or sodium chloride, usually is added. Also it is desirable to maintain the nickel concentration in the fresh acid stream to the stripping step between about 10 and 60 g/l to facilitate maintaining a relatively high nickel concentration in the electrolyte, thereby providing conditions which favor recovery of nickel in the form of coherent dense cathodes. When other nickel recovery steps are employed, the fresh acid stream to the nickel stripping step need not contain nickel. Thus, the nickel could be recovered by reacting the nickel containing solution with sodium carbonate and recovering nickel by decomposing the nickel carbonate formed and reducing the resultant oxide. It is to be understood that the nickel can be recovered by any conventional means for obtaining pure nickel from a nickel containing solution.

The oximes containing nickel and copper which can be used in accordance with the invention includes α-hydroxy oximes, substituted hydroxy benzophenoximes, and mixtures thereof.

The α-hydroxy oxime component has the general formula

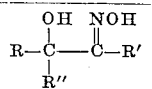

wherein R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups, containing from about 6 to 20 carbon atoms, R and R' are also preferably the same and, when alkyl, are preferably attached to the carbons substitured with the —OH and =NOH groups through a secondary carbon atom. It is also preferred that R'' is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5-10-diethyl - 8 - hydroxytetradecan-7-oxime, and 5, 8-diethyl-7-hydroxydodecane-6-oxime. The latter compound has the following structural formula:

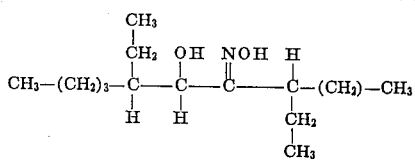

Representative of other mono- and polyunsaturated radicals are heptenyl, octenyl, decenyl, octadecenyl, octadencynyl and alkyl substituted radicals such as ethylocatadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The substituted benzophenoximes useful in the present invention have the following formula:

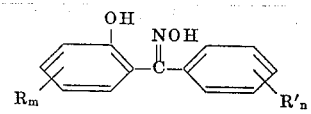

in which R and R' may be individually alike or different and are saturated aliphatic groups, ethylenically unsaturated aliphatic groups or saturated or ethylenically unsaturated aliphatic ether groups (i.e. - OR'') and $m$ and $n$ are 0, 1, 2, 3 or 4 with the proviso that $m$ and $n$ are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type include the following:

2-hydroxy-3'methyl-5-ethylbenzophenoxime
2-hydroxy-5-(1, 1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecyloxybenzophenoxime
2-hydroxy-4'-(1,1-dimethylethyl)-5-methyl-benzophenoxime
2-hydroxy-4',5-bis-(1,1-dimethylethyl)benzophenoxime When the α-hydroxy aliphatic oximes are employed in combination with the 2-hydroxy benzophenoximes, the α-hydroxy aliphatic oxime extractants having the following general formula may be used:

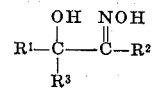

where $R^1$, $R^2$ and $R^3$ may be any of a variety of organic radicals such as aliphatic and alkylarly radicals. $R^3$ may also be hydrogen. Preferably, $R^1$ and $R^2$ are unsaturated hydrocarbon or branched chain alkyl groups containing from about 6 to 20 carbon atoms. $R^1$ and $R^2$ are also preferably the same and when alkyl are preferably attached to the carbons substituted with the —OH and =NOH groups through a secondary carbon atom. It is also preferred that $R^3$ is hydrogen on unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18oxime, 5,10-diethyl-8-hydroxytetradecan-7-oxime, and 5,8-diethyl-7-hydroxydodecane-6-oxime. The latter compound has the following structural formula:

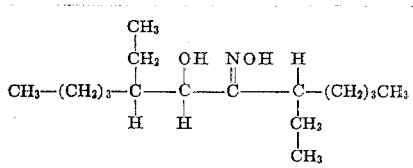

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like. The $R^1$, $R^2$ and $R^3$ groups may contain inert substituents.

The relative amounts of the two extractants in the compositions of the present invention can be varied widely with even minute quantities of the α-hydroxy aliphatic oxime being beneficial. However, it is preferred to employ it in the range of 1 to 100% by weight based on the weight of the 2-hydroxy benzophenoxime, with best results obtainable in the range of 15–50%. The amount of the extractants in the organic solvent likewise can vary within considerable limits. In general, however, the concentration of total oxime is in the range 2–25%, based on the weight of the organic extracting solution, preferably in the range of 5–15%.

These and other suitable oximes are disclosed for example by U.S. Pat. Nos. 3,224,873, 3,592,775, 3,455,680, 3,428,449, 3,276,863 and 3,197,274. Particularly suitable extractants comprise 2-hydroxy-4-nonyl-benzophenoxime which is the primary extractant in a composition also containing an α-hydroxy oxime sold by General Mills Inc. under the tradename LIX-64N, 5,8-diethyl-7-hydroxy-6-dodecanone oxime which is the primary extractant in a composition sold by General Mills Inc. under the tradename LIX-63 and 2-hydroxy-4-dodecyl-henzophenoxime which is the primary extractant in the composition also containing an α-hydroxy oxime sold by General Mills Inc. under the tradename LIX-64.

The following examples illustrate the present invention and are not intended to limit the same.

EXAMPLE I

A copper and nickel loaded 20 volume% LIX-64N in kerosene was prepared by co-extracting copper and nickel from an aqueous ammoniacal leach stream solution containing 10.3 g/l Cu, 10.1 g/l Ni, 71.9 g/l $NH_3$, and 42.8 g/l $CO_2$. The aqueous stream and oxime stream were contacted counter-currently in three extraction stages. The metal-loaded LIX-64N was subsequently scrubbed with a one molar solution of $NH_4HCO_3$ to yield an organic stream containing 2.79 g Cu, 1.52 g Ni and 0.08 g $NH_3$ per liter. The organic stream thus prepared was used as feed to the strip experiment of this example. An aqueous strip solution was made up to contain 53 g/l Ni, 40 g/l $H_2SO_4$, 15 g/l $H_3BO_3$ and 100 g/l $Na_2SO_4$.

A countercurrent mixer-settler circuit was used which consisted of 6 strip stages; each strip stage having calibrated flowmeters in recycle lines to regulate the flow of aqueous solution. The recycle lines were also equipped with heat exchangers in order to maintain a temperature of about 44° C. through the circuit. The circuit was operated continuously under the following conditions:

| | |
|---|---|
| Organic flow rate: | 77ml/min. |
| Strip solution flow rate: | 4.9 ml/min. |
| Organic/aqueous volume ratio: | 15.8 |
| Exchangeable hydrogen ion/ oxime nickel ion mole ratio | 2.00 |
| Strip solution recycle rate: 20–25 ml/min. | |
| Contact time per stage: | 2 minutes |

After the stripping circuit had reached equilibrium, organic and aqueous samples from each settler compartment of the circuit were taken and analyzed for Cu and Ni. In addition, the pH of the aqueous samples was measured. The analytical data were used to calculate the percentage of Ni stripped, and the Cu: Ni ratio of the organic, after each stage of the circuit. The experimental and calculated results of this example are summarized in the following table.

| | Aqueous Phase | Organic Phase (g/l) | | Organic Phase (g/l) | | % Nickel Stripped | Cu:Ni Ratio in Organic |
|---|---|---|---|---|---|---|---|
| | pH | Cu | Ni | Cu | Ni | | |
| Organic Feed | — | 2.79 | 1.52 | — | — | — | 1.8 |
| Strip Stage No. 1* | 2.46 | 2.85 | 1.26 | 0.022 | 78.2 | 17.1 | 2.3 |
| Strip Stage No. 2 | 1.55 | 3.07 | 0.41 | 0.807 | 72.1 | 73.4 | 7.6 |
| Strip Stage No. 3 | 1.35 | 3.22 | 0.23 | 4.55 | 59.9 | 85.2 | 14 |
| Strip Stage No. 4 | 1.30 | 3.33 | 0.036 | 6.24 | 58.0 | 97.6 | 93 |
| Strip Stage No. 5 | 1.25 | 3.28 | 0.009 | 6.40 | 55.3 | 99.4 | 364 |
| Strip Stage No. 6** | 1.25 | 2.93 | 0.006 | 5.61 | 54.9 | 99.6 | 488 |

\* Metal loaded organic in, strip concentrate out.
\*\*Strip solution in, stripped organic out.

The experimental results of this example demonstrate that multistage contacting of Cu-Ni loaded LIX- 64N solution with a solution containing Ni, $H_3BO_3$, $Na_2SO_4$ and $40gH_2SO_4$ per liter will separate effectively the Cu and Ni contained in the LIX-64N solution. The Ni strip concentrate resulting from the separation has a pH which permits recovery of metallic nickel by electrowinning.

| | Aqueous Phase | Organic Phase (g/l) | | Aqueous Phase (g/l) | | % Ni Stripped | Cu:Ni Ratio in Organic |
|---|---|---|---|---|---|---|---|
| | pH | Cu | Ni | Cu | Ni | | |
| Organic Feed | — | 4.92 | 4.18 | — | — | — | 1.2 |
| Strip Stage No. 1* | 2.55 | 5.05 | 3.26 | 0.004 | 76.4 | 22.0 | 1.6 |
| Strip Stage No. 2 | 1.40 | 5.45 | 1.29 | 0.515 | 72.8 | 69.1 | 4.2 |
| Strip Stage No. 3 | 0.90 | 5.85 | 0.292 | 3.96 | 60.2 | 93.0 | 20 |
| Strip Stage No. 4 | 0.80 | 5.79 | 0.044 | 5.78 | 56.6 | 99.0 | 132 |
| Strip Stage No. 5 | 0.78 | 5.91 | 0.010 | 5.94 | 52.6 | 99.76 | 591 |
| Strip Stage No. 6** | 0.72 | 4.99 | 0.0085 | 4.88 | 51.3 | 99.78 | 587 |

\* Metal-loaded organic in, strip concentrate out.
\*\*Strip solution in, stripped organic out.

EXAMPLE II

This example illustrates the process of this invention employing a kerosene solution containing 40 volume % LIX-64N.

Approximately 30 liters of Cu-Ni loaded 40 volume % LIX-64N in kerosene was prepared by coextracting Cu and Ni from an aqueous ammoniacal leach solution containing 9.29 g Cu, 8.01 g Ni, 70.4 g $NH_3$ and 51.9 g $CO_2$ per liter. The metal-loaded LIX-64N was subsequently scrubbed with a solution of $NH_4HCO_3$ to yield an organic solution containing 4.92 g Cu, 4.18 g Ni and 0.018 g $NH_3$ per liter. The organic solution thus prepared was used as feed to a stripping step wherein it was contacted with an aqueous strip solution containing 50.6 g Ni, 40 g $H_2SO_4$, 15 g $H_3BO_3$, and 100 g $Na_2SO_4$ per liter.

The countercurrent mixer-settler circuit used was identical to that described in Example I. The circuit was operated continuously for about 9 hours under the following experimental conditions:

| | |
|---|---|
| Organic flow rate: | 65 ml/min. |
| Strip solution flow rate: | 10.9 ml/min. |
| Organic/aqueous ratio: | 6.0 |
| Exchangeable hydrogen ion/nickel ion mole ratio: | 1.92 |
| Strip solution recycle rate: | 20–25 ml/min. |
| Contact time per stage: | 2 minutes |
| Temperature: | 41–50° C. |

After the circuit had been operated for about 2 hours, the strip concentrate leaving the first stage was sampled. Additional samples were taken with one hour intervals from the strip concentrate leaving the first stage until the experiment was terminated. After pH measurements, all samples were analyzed and found to contain the following concentrations of Cu and Ni:

| Time from Start of Experiment | Ni Strip Concentrate | | |
|---|---|---|---|
| | pH | Cu (g/l) | Ni (g/l) |
| Aqueous feed | — | 0.001 | 50.6 |
| 2 hours | 1.68 | 0.133 | 75.6 |
| 3 hours | 1.80 | 0.100 | 78.2 |
| 4 hours | 2.02 | 0.041 | 78.5 |
| 5 hours | 2.23 | 0.027 | 77.9 |
| 6 hours | 2.38 | 0.014 | 78.4 |
| 7 hours | 2.45 | 0.008 | 78.3 |
| 8 hours | 2.56 | 0.007 | 78.2 |

Prior to terminating the experiment, organic and aqueous samples from each settler compartment of the circuit were taken and analyzed for Cu and Ni and pH. The analytical data were used to calculate the percentage of Ni stripped, and the Cu:Ni ratio in the organic, after each stage of the circuit. The experimental and calculated results of this experiment are summarized in the following table.

I claim:

1. A process for selectively removing nickel from a water-immiscible organic oxime extractant containing copper and nickel which comprises contacting said oxime extractant with an aqueous acid solution containing an acid of the type which forms a water soluble nickel salt when reacted with nickel, said contacting of said extractant and said acid solution causing nickel ion transfer from the oxime extractant to the aqueous solution and hydrogen ion transfer from the aqueous solution to the oxime extractant in accordance with the equation:

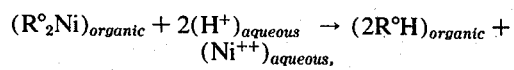

$$(R°_2Ni)_{organic} + 2(H^+)_{aqueous} \rightarrow (2R°H)_{organic} + (Ni^{++})_{aqueous},$$

where R° is the oxime organic moiety, the mole ratio of hydrogen ion in the aqueous solution to nickel ion in the oxime extractant being maintained between about 1.8 and 2.2.

2. The process of claim 1 wherein the aqueous acid solution contains sulfuric acid as a source of exchangeable hydrogen ion.

3. The process of claim 1 wherein the aqueous acid solution contains sulfuric acid, boric acid and nickel and wherein pure nickel is recovered from the aqueous acid solution after contacting the oxime extractant by electrowinning.

4. The process of claim 1 wherein the oxime comprises 2-hydroxy-4-nonyl-benzophenoxime.

5. The process of claim 2 wherein the oxime comprises 2-hydroxy-4-nonyl-benzophenoxime.

6. The process of claim 3 wherein the oxime comprises 2-hydroxy-4-nonyl-benzophenoxime.

7. The process of claim 1 wherein the oxime extractant consists essentially of
   a. a benzophenoxime of the formula

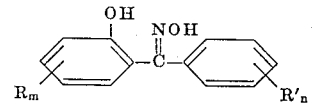

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined, $m$ and $n$ are 0, 1, 2, 3 or 4 with the proviso that both are not 0 and the total number of carbon atoms in $R_m$ and $R'_n$ is from 3–25, and (b) an α-hydroxy aliphatic oxime of the formula

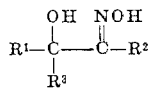

where $R^1$ and $R^2$ contain about 6 to 20 carbon atoms and are ethylenically unsaturated hydrocarbon or branched chain alkyl groups and $R^3$ is selected from the group consisting of hydrogen and ethylenically unsaturated hydrocarbon and branched chain alkyl groups of about 6 to 20 carbon atoms, said benzophenoxime (a) and α-hydroxy aliphatic oxime (b) being further characterized as being essentially insoluble in water and having a solubility of at least about 2% by weight in an essentially water immiscible organic solvent and said α-hydroxy aliphatic oxime (b) being present in the proportion of 1–100% based on the weight of the benzophenoxime (a).

8. The process of claim 1 wherein the oxime extractant comprises an α-hydroxy oxime of the formula:

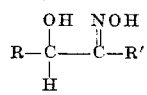

where R and R' are branched chain alkyl groups containing 6 to 20 carbon atoms attached to the carbons substituted with the —OH and =NOH groups through secondary carbon atoms, said oximes being further characterized as having a total carbon atom content of 14 to about 40.

9. The process of claim 1 wherein the oxime comprises 5,8 - diethyl -7- hydroxy -6- dodecanone oxime.

10. The process of claim 2 wherein the oxime comprises 5,8 - diethyl -7- hydroxy -6- dodecanone oxime.

11. The process of claim 3 wherein the oxime comprises 5,8 - diethyl -7- hydroxy -6- dodecanone oxime.

12. A process for selectively removing nickel from a water-immiscible organic oxime extractant loaded with copper and nickel comprising introducing said extractant into a first of a plurality of stripping stages and flowing said extractant through said plurality of stripping stages to a last stripping stage, introducing an aqueous acid solution containing an acid of the type which forms a water soluble nickel salt when reacted with nickel into said last stage and flowing said aqueous acid solution countercurrent to the flow of said extractant through said stages, the mole ratio of hydrogen ion in the aqueous solution introduced at said last stage to nickel ion in the oxime extractant introduced at said first stage being maintained between the range of about 1.8 to 2.2, the mole ratio of hydrogen ion in the aqueous solution to nickel ion in the oxime extractant being chosen to cause nickel ion in the oxime extractant to transfer to the aqueous solution in preference to copper ion with hydrogen ion in the aqueous solution transferring to the oxime extractant to replace the nickel ion transferred therefrom.

13. The process as set forth in claim 12 wherein a nickel rich aqueous solution is flowed from said first stage to a nickel recovering zone and the aqueous acid solution is introduced into said last stage after the nickel values therein are removed.

14. The process as set forth in claim 13 wherein the substantially nickel free organic extractant loaded with copper is flowed from said last stage to a copper stripping stage.

15. The process as set forth in claim 14 wherein the acid in said aqueous acid solution is an acid selected from the group consisting of sulfuric acid, hydrochloric acid, nitric acid and mixtures thereof and wherein said oxime extractant is an oxime selected from the group consisting of 2-hydroxy-4-nonyl-benzophenoxime and 5,8 - diethyl -7- hydroxy -6- dodecanone oxime.

* * * * *